United States Patent
Bethge et al.

(10) Patent No.: US 12,447,976 B2
(45) Date of Patent: Oct. 21, 2025

(54) METHOD FOR PRODUCING A MODEL FOR AUTOMATED PREDICTION OF INTERACTIONS OF A USER WITH A USER INTERFACE OF A MOTOR VEHICLE

(71) Applicant: Dr. Ing. h.c. F. Porsche Aktiengesellschaft, Stuttgart (DE)

(72) Inventors: David Bethge, Stuttgart-Feuerbach (DE); Jannik Wolf, Filderstadt (DE); Marco Wiedner, Karlsruhe (DE); Mohamed Kari, Essen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 189 days.

(21) Appl. No.: 17/972,979

(22) Filed: Oct. 25, 2022

(65) Prior Publication Data
US 2023/0146013 A1    May 11, 2023

(30) Foreign Application Priority Data

Nov. 9, 2021    (DE) ............ 10 2021 129 085.6

(51) Int. Cl.
*B60W 50/00* (2006.01)
*B60W 40/08* (2012.01)
(Continued)

(52) U.S. Cl.
CPC ........ *B60W 50/0097* (2013.01); *B60W 40/08* (2013.01); *B60W 40/105* (2013.01);
(Continued)

(58) Field of Classification Search
CPC ............. B60W 50/0097; B60W 40/08; B60W 40/105; B60W 50/14; B60W 2050/0029;
(Continued)

(56) References Cited

U.S. PATENT DOCUMENTS 5,592,385 A *   1/1997   Katayama ............ B60K 31/047
                                                    701/93
2001/0022554 A1* 9/2001  Coene ................... H03M 13/31
                                                    341/59
(Continued)

FOREIGN PATENT DOCUMENTS

DE    10 2014 202 234     8/2015
DE    10 2019 109 689     10/2020
(Continued)

*Primary Examiner* — Fadey S. Jabr
*Assistant Examiner* — Faris Asim Shaikh
(74) *Attorney, Agent, or Firm* — Gerald E. Hespos; Michael J Porco

(57) ABSTRACT

A method for producing a model (15) for automated prediction of interactions of a user with a user interface of a motor vehicle. Vehicle operating logs (11, 12, 13) are provided and each includes a record of a time sequence of user interactions with the user interface. Each of the user interactions recorded in the vehicle operating logs (11, 12, 13) is assigned context information (21, 22) that includes a functional category (21) of the user interaction and a driving state (22) of the motor vehicle at the time of the user interaction. Training data (14) are generated based on the vehicle operating logs (11, 12, 13) and the associated context information (21, 22). A context-sensitive interaction model (15) is trained by machine learning on the basis of the training data (14) to make a prediction about a future user interaction based on a time sequence of past user interactions.

11 Claims, 1 Drawing Sheet

(51) Int. Cl.
*B60W 40/105* (2012.01)
*B60W 50/14* (2020.01)
*G06N 5/01* (2023.01)
*H04L 12/40* (2006.01)

(52) U.S. Cl.
CPC ............... *B60W 50/14* (2013.01); *G06N 5/01* (2023.01); *H04L 12/40* (2013.01); *B60W 2050/0029* (2013.01); *B60W 2050/0083* (2013.01); *B60W 2050/146* (2013.01); *B60W 2556/10* (2020.02); *H04L 2012/40215* (2013.01); *H04L 2012/40273* (2013.01)

(58) Field of Classification Search
CPC ... B60W 2050/0083; B60W 2050/146; B60W 2556/10; B60W 2040/0818; B60W 2040/0827; B60W 2040/0836; B60W 2040/0845; B60W 2040/0854; B60W 2040/0863; B60W 2040/0872; B60W 2040/089; B60W 40/09; B60W 40/10; B60W 40/12; B60W 40/107; B60W 40/109; B60W 40/1005; B60W 40/101; B60W 40/103; B60W 40/11; B60W 40/112; B60W 40/114; B60W 40/13; B60W 2040/1307; B60W 2040/1315; B60W 2040/1323; B60W 2040/133; B60W 2040/1338; B60W 2040/1346; B60W 2040/1353; B60W 2040/1361; B60W 2040/1369; B60W 2040/1376; B60W 2040/1384; B60W 2040/1392; B60W 40/00; B60W 2540/221; B60W 2540/00; B60W 2540/10; B60W 2540/106; B60W 2540/12; B60W 2540/14; B60W 2540/21; B60W 2540/18; B60W 2540/22; B60W 2540/225; B60W 2540/227; B60W 2540/24; B60W 2540/26; B60W 2540/30; B60W 2540/229; G06N 5/01; G06N 20/20; G06N 3/049; G06N 20/00; G06N 20/10; G06N 3/044; G06N 3/08; G06N 7/01; G06N 3/04; H04L 12/40; H04L 2012/40215; H04L 2012/40273; H04L 67/2866; H04L 45/46; H04L 41/0893; H04L 41/16; H04L 67/535; G06F 3/017; G06F 3/016; G06T 7/33; G06T 7/13; G06T 2207/20084; G06V 20/597; H04M 1/72454; H04M 1/72457; H04M 1/724631; H04M 1/72463; H04M 1/72469; H04M 1/72472; H04M 1/72475; H04M 1/72478; H04M 1/72481; H04M 1/72448; H04M 1/72451; H04M 1/724; B60T 8/329; B60T 8/172
See application file for complete search history.

(56) References Cited

U.S. PATENT DOCUMENTS

| | | | |
|---|---|---|---|
| 2006/0209188 A1* | 9/2006 | Mizusawa | B62D 15/0295 348/148 |
| 2010/0082190 A1* | 4/2010 | Jinno | B60K 6/52 903/918 |
| 2012/0188250 A1* | 7/2012 | Kaplan | G06Q 10/10 345/440 |
| 2016/0297422 A1* | 10/2016 | Jehle | B60L 15/20 |
| 2017/0249844 A1* | 8/2017 | Perkins | G06V 20/59 |
| 2017/0313323 A1* | 11/2017 | Tseng | B60K 35/00 |
| 2018/0095614 A1 | 4/2018 | Klos et al. | |
| 2018/0148036 A1* | 5/2018 | Gaither | B60W 20/12 |
| 2018/0186360 A1* | 7/2018 | Jo | B60W 20/15 |
| 2020/0065968 A1* | 2/2020 | Sargent | G06V 10/82 |
| 2020/0114926 A1* | 4/2020 | Liu | G06N 20/00 |
| 2021/0053574 A1* | 2/2021 | Bielby | B60R 16/0232 |
| 2021/0129871 A1* | 5/2021 | Malla | G06T 7/70 |
| 2021/0192872 A1 | 6/2021 | Morita et al. | |
| 2021/0216916 A1* | 7/2021 | Madhavan | G06F 18/2451 |
| 2021/0263586 A1 | 8/2021 | Wang | |
| 2021/0264075 A1 | 8/2021 | Junginger et al. | |
| 2021/0331677 A1* | 10/2021 | Kim | B60W 40/10 |
| 2021/0334565 A1 | 10/2021 | Roche et al. | |
| 2021/0382586 A1* | 12/2021 | Bielby | G06F 3/0482 |
| 2022/0161815 A1* | 5/2022 | Van Beek | B60W 60/00274 |
| 2022/0221964 A1* | 7/2022 | Ko | H04L 51/224 |
| 2022/0317674 A1* | 10/2022 | Sahaf | G16B 30/00 |
| 2022/0318641 A1* | 10/2022 | Carreira-Perpiñán | G06N 20/20 |
| 2022/0402522 A1* | 12/2022 | Tummala | G06N 20/20 |
| 2023/0065399 A1* | 3/2023 | Ren | G16H 30/40 |
| 2023/0186106 A1* | 6/2023 | Valdes | G06F 18/24323 706/46 |
| 2023/0245651 A1* | 8/2023 | Wang | G06N 5/022 704/275 |
| 2023/0395255 A1* | 12/2023 | Zhang | G16H 20/10 |
| 2024/0126288 A1* | 4/2024 | Cella | A61B 5/6893 |
| 2024/0169186 A1* | 5/2024 | Zang | G06N 3/084 |

FOREIGN PATENT DOCUMENTS

| | | |
|---|---|---|
| DE | 10 2019 217 346 | 5/2021 |
| DE | 10 2019 218 129 | 5/2021 |

\* cited by examiner

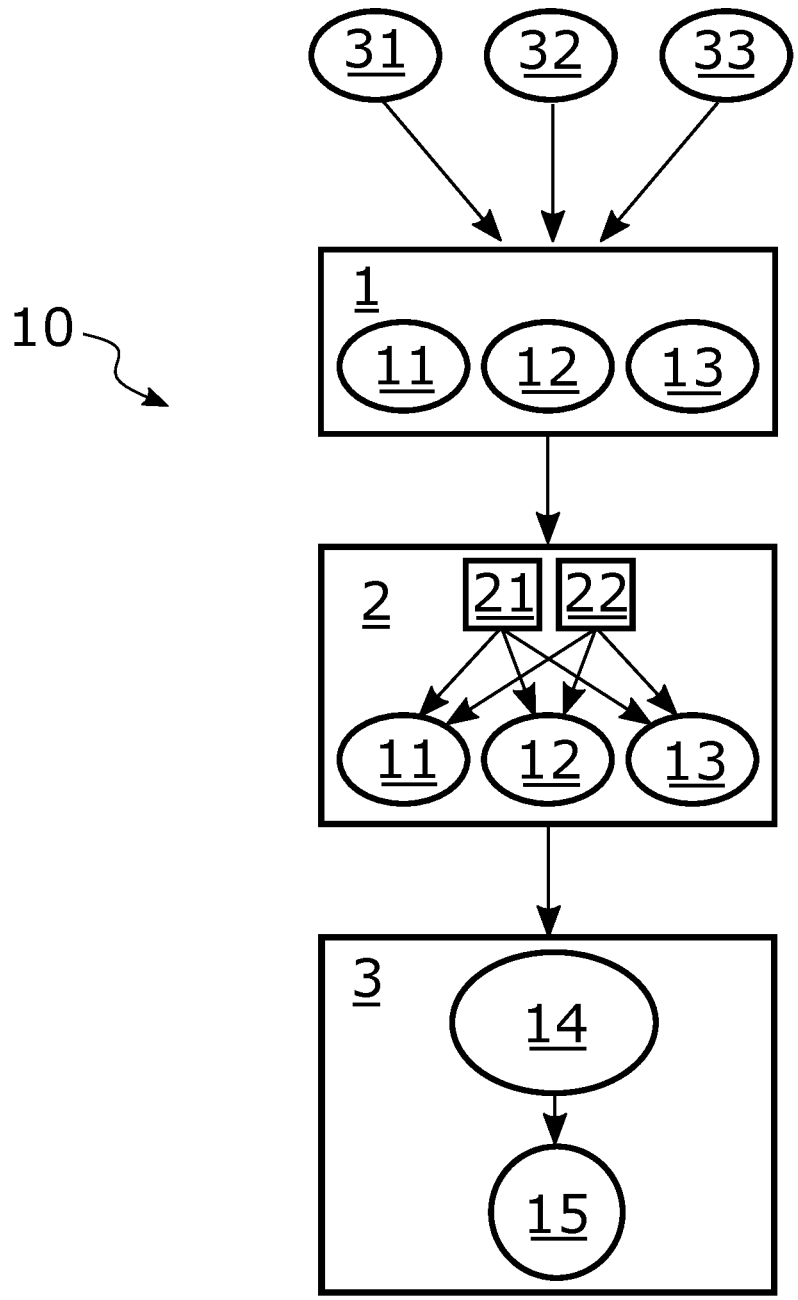

METHOD FOR PRODUCING A MODEL FOR AUTOMATED PREDICTION OF INTERACTIONS OF A USER WITH A USER INTERFACE OF A MOTOR VEHICLE

CROSS-REFERENCE TO RELATED APPLICATION

This application claims priority on German Patent Application No 10 2021 129 085.6 filed Nov. 9, 2021, the entire disclosure of which is incorporated herein by reference.

BACKGROUND

Field of the Invention. The invention relates to a method for producing a model for automated prediction of interactions of a user with a user interface of a motor vehicle. The invention also relates to a method for automated prediction of interactions of a user with a user interface of a motor vehicle, a data processing unit for a motor vehicle and a motor vehicle.

Related Art Technologies from the fields of automotive user interfaces, ubiquitous computing and driver supervision can be brought together to enable the development of a myriad of new design opportunities for interactions between driver and vehicle. The overarching goal is to improve usability and to increase driving safety. One approach that is used here are context-sensitive or context-adaptive systems, in which the behavior of the human machine interface (HMI) is adapted to the current situation by taking into account contextual information about the state of the user or the vehicle. Known examples from this field are automatic adjustments of a key illumination to the current light conditions and zooming in or out of a navigation view when the vehicle speed changes.

In this context, US 2018/0095614 A1 discloses a method in which an intention of the user is determined on the basis of recorded data of a user interface, and the functional scope of the vehicle is adapted on the basis of this intention. DE 10 2019 217 346 A1 discloses a method in which a cognitive load of the driver is determined on the basis of the driving situation, and an information density of the user interface is increased or decreased accordingly. Lastly, DE 10 2014 202 234 A1 describes a method in which operating accesses to a device are assigned to a situation acquired via sensor data, and operation of the device is initiated on the basis of this assignment at a later time when there is again an operating access in a current situation.

Such methods use context information about the current situation to make automated predictions about future interactions based on past interactions with the user interface or to make adjustments that assist the user in these interactions. Such forecasting systems can be based on user behavior models created by machine learning using data collected in the past, such as CAN bus (CAN: control area network) data. Examples include context-sensitive modeling of user behavior using semantic information acquired via speech recognition (Harsham et al. "Driver prediction to improve interaction with in-vehicle HMI", Proc. workshop on digital signal processing for in-vehicle systems) or using contextual information about the current traffic situation (Hori et al. "Driver confusion status detection using recurrent neural networks", 2016 IEEE International Conference on Multimedia and Expo).

In light of this, an object is to provide a method to create a model for reliably predicting interactions of a vehicle user with a user interface.

SUMMARY

The disclosure relates to a method for producing a model for automated prediction of interactions of a user with a user interface of a motor vehicle. The method comprises the following steps:
 providing vehicle operating logs where each vehicle operating log includes a record of a time sequence of user interactions with the user interface;
 assigning context information to each of the user interactions recorded in the vehicle operating logs, where the context information includes a functional category of the user interaction and a driving state of the motor vehicle at the time of the user interaction, and where training data is generated on the basis of the vehicle operating logs and the associated context information;
 training a context-sensitive interaction model by machine learning based of the training data to make a prediction about a future user interaction on the basis of a time sequence of past user interactions.

The method makes it possible to create a context-sensitive model for the interactions between the user and the user interface (hereinafter also abbreviated as HMI "human machine interface") on the basis of empirical data about user behavior by means of machine learning. The driving state of the motor vehicle and the functional category of the interaction serve as the context information. Thus, a high precision of the interaction model can be achieved by taking these two context variables into account. The model can be used to make predictions about the next user interaction in real time and can dynamically adapt the user interface to assist the user in operating the interface and/or appropriately direct his or her attention. Thus, it is possible to increase both operating comfort and driving safety significantly.

The user interface of the motor vehicle can comprise one or more visual, haptic, speech-based and/or gesture-based subinterfaces. The user interface may include one or more touch-sensitive control surfaces (touch screens), voice control, and/or a plurality of electromechanical control elements such as buttons, switches, and/or rotary controls. To train the prediction model, a database must first be made available in which various time sequences of user interactions are recorded. This can be accomplished by collecting data from different users to create an interaction model that corresponds to a statistical average over the entire group of users. Alternatively, the data of a single user can be used to create a personalized model for the behavior of that specific user. In some embodiments, the data traffic of the internal vehicle data network, via which signals are exchanged between the various system components are evaluated to provide a vehicle operating log. For the sake of brevity, these signals are referred to hereinafter as CAN signals in reference to the CAN bus of the vehicle. These data also can be obtained from another fieldbus or communication system. A log file of the data exchange can be used, for example, or a log file of the data exchange can be merged with a log file of the user interface. Each log file may correspond to a record of a single trip of a user. The raw data read from the vehicle can be filtered and/or preprocessed using additional information and converted into structured data sets, for example in the form of a tabular database. Interactions with the user interface then are identified in the vehicle operating logs and each interaction is paired with the two associated context variables. The training data obtained from the logs includes the time sequence of the user interactions along with the associated driving state and the functional category, so that the model trained with this training data can be used to make a prediction about future interactions of the user by contextually taking into account the driving state and functional category.

The method defines a workflow or a "machine learning pipeline" with which a context-sensitive interaction model can be trained on the basis of vehicle operating data (in particular records of CAN and HMI signals). The basic scheme of the method allows for different variations and configurations as described herein.

In some embodiments, the functional category for assignment to the respective user interaction is selected from a plurality of predetermined functional categories. The predetermined functional categories may include: navigation, vehicle information, settings, telephony, multimedia, tuner, network connection, digital address book, digital vehicle operating manual. The functional category records which functionality of the HMI or the motor vehicle is associated with the respective user interaction, such as a query or change in the user settings of the HMI or an input on the navigation panel. The possible functional categories can be numbered and the number of the corresponding category can be converted by a one-hot encoding into a bit encoding that is used to identify the functional category.

The driving state may be selected from predetermined driving states for assignment to the respective user interaction. The selection may be made on the basis of a driving speed of the motor vehicle at the time of the user interaction. In some embodiments, the driving state is determined on the basis of the trajectory of the vehicle. For example, the driving state can indicate the range in the speed of the vehicle at the time of the user interaction (standstill, low or high speed, etc.). The driving state also can be determined on the basis of a steering state or an acceleration or braking state of the vehicle.

In some embodiments, the driving state is selected from two predetermined driving states. For example, a first driving state is in selected when the driving speed of the motor vehicle is above a predetermined threshold value and if not a second driving state is selected. The driving state is thus represented by a binary variable. This binary variable can assume the value one if the vehicle is moving at a speed greater than a predetermined threshold value. Conversely, if the speed is less than or equal to the threshold value, the variable is set to zero. The threshold value can be set to 8 km/h, for example, to distinguish both a complete stop of the vehicle and slow rolling (for example in front of a traffic light) from a moving state.

In some embodiments, a selection step in which a classifier for the context-sensitive interaction model is selected on the basis of the training data is carried out after the assigning step and before the training step. The selection of the classifier may be carried out by a grid search with a cross-validation on the training data. For example, the classifier may be selected from the following classifiers: Extra Trees classifier, Random Forest classifier, AdaBoost classifier, Gradient Boosting classifier, support-vector machine, or decision tree. In this configuration of the method, the classifier for the interaction model initially is determined on the basis of the training data. A hyperparameter optimization, in which the hyperparameter space of one or more models is searched for optimal parameters, may be carried out in the selection step. For example, the classifier that has the highest F1 score can be selected. Only shallow learning models may be taken into account for the selection to avoid overfitting in the training step. However, higher recognition performance can sometimes be achieved by taking deep learning models into account.

In some embodiments, the classifier is established without a selection step. The classifier of the context-sensitive interaction model can be a decision tree, such as a decision tree having a maximum tree depth of 8. A decision tree classifier has proven to be particularly favorable for creating the interaction model, because such a classifier makes it possible to achieve a high precision of predictions and a decision tree moreover is based on explicit classification rules that easily can be embedded in a data processing unit, e.g., an electronic control unit (ECU) of the vehicle. Setting the maximum tree depth to 8 achieves a favorable trade-off between sufficient depth and the risk of overfitting.

The interaction model created with the method disclosed herein can be used for automated prediction of interactions of a user with a user interface of a motor vehicle. More particularly, the interaction model produced by the disclosed method is used to make a prediction about a future user interaction on the basis of a time sequence of past user interactions in a prediction step. Thus, a prediction may be made about the future user interaction that immediately follows a most recently carried out user interaction. The prediction step can be repeated at multiple successive points in time, so that a current prediction is available at each point in time. The prediction step can be repeated at regular time intervals, such as once per second.

In some embodiments, a prediction of an input mode of the future user interaction is made, such as an input mode selected from: touchscreen, hardkey, speech. Thus, it is thus possible to discern whether the input for a future interaction will be made via: the touch screen; by actuating or activating a hardkey, i.e., a control element with a dedicated functionality; or voice input.

A control panel and/or a display field of the user interface may be adjusted on the basis of the prediction about the future user interaction in an adjustment step. The adjustment may include a scaling and/or shifting of a displayed content or a visual highlighting of a control element and/or a display element. The brightness of an illuminated display or control element can be increased or decreased, for example, depending on whether the user is likely to be using the respective element. The input itself can also be anticipated, for example, by triggering the user interface or vehicle adjustment requested by the predicted input without or before the user actually makes the input.

In some embodiments, vehicle operating data is read from a data network of the motor vehicle and/or one or more other motor vehicles for providing the vehicle operating logs and/or vehicle operating data may be read from a data network of the motor vehicle for recording the time sequence of past user interactions. The vehicle operating data may be read from a CAN bus.

The invention also relates to a data processing unit for a motor vehicle. The data processing unit may be configured to carry out an embodiment of the method described above for automated prediction of interactions of a user with a user interface of a motor vehicle. Alternatively or additionally, the data processing unit can be configured to carry out an embodiment of the method for producing a model for automated prediction of interactions. Thus, it is possible to achieve a personalization of the behavior of the user interface, because the data processing unit continuously collects data about the interaction behavior of the user and produces a model of the interaction behavior of the user by means of the method according to the invention.

The invention further relates to a motor vehicle comprising a data network and a data processing unit. The motor vehicle is configured to carry out any one of the above-described methods for producing an interaction model and/or is configured to carry out any one of the above-described embodiments of the method for automated prediction of interactions, wherein, to implement the method for producing a model for automated prediction of interactions of a user with a user interface of a motor vehicle, the data processing unit is configured to read vehicle operating data from the data network and, on the basis of the vehicle operating data, provide vehicle operating logs in the providing step. The data processing unit also is configured to carry out the assigning step and the training step. The motor vehicle can be equipped with functionalities for automated driving according to the SAE J3016 level 2 standard and/or can comprise a wireless transmission module for CAN bus and HMI data.

All of the configurations and advantages described in relation to the methods of the invention apply analogously to the data processing unit of the invention and the motor vehicle. The steps carried out in the configurations of the method may be carried out by the data processing unit of the motor vehicle.

Further details and advantages of the invention will be explained in the following with reference to the design example shown in the drawings.

BRIEF DESCRIPTION OF THE DRAWING

FIG. 1 is a schematic illustration that shows an implementation of the method according to the invention.

DETAILED DESCRIPTION

At the outset, it should be understood that the elements and functions described herein and shown in FIG. 1 may be implemented in various forms of hardware, software or combinations thereof. These elements may be implemented in a combination of hardware and software on one or more appropriately programmed general-purpose devices, which may include a processor, memory and input/output interfaces. The term "coupled" as used or implied herein mean directly connected to or indirectly connected with through one or more intermediate components. Such intermediate components may include both hardware and software-based components.

Those skilled in the art will appreciate that the blocks shown in the flow chart of FIG. 1 represent conceptual views of illustrative circuitry embodying the principles of the disclosure and/or also represent various processes that may be represented substantially in computer readable media and so executed by a computer or processor, whether or not such computer or processor is explicitly shown.

The functions illustrated schematically in the flow chart of FIG. 1 may be carried out with a control unit that may be provided through the use of dedicated hardware as well as hardware capable of executing software in association with appropriate software. In one embodiment, some or all of the functions may be performed by at least one processor, such as a computer or an electronic data processor, digital signal processor or embedded micro-controller, in accordance with code, such as computer program code, software, and/or integrated circuits that are coded to perform such functions, unless indicated otherwise. When provided by a processor, the functions may be provided by a single dedicated processor, by a single shared processor, or by a plurality of individual processors, some of which may be shared. Moreover, the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage. Other hardware, conventional and/or custom, may also be included in the control unit, such as a memory, input/output interfaces, a wireless transceiver, analog-to-digital converters, etc.

FIG. 1 shows a basic scheme of a method 10 for producing a model 15 for automated prediction of interactions of a user with a user interface of a motor vehicle. In the first step 1, a database is provided initially in the form of vehicle operating logs 11, 12, 13 in which various time sequences of user interactions are recorded. As a design example for carrying out the method 10, it is assumed that vehicle operating data 31, 32, 33 are collected from different users to create an interaction model 15 that corresponds to a statistical average over the entire group of users. The motor vehicles of the users are equipped with functionalities for automated driving according to the SAE J3016 level 2 standard and comprise a wireless transmission module for CAN bus and HMI data that transmits data sets to the backend at two-minute intervals. Changes in signal values are logged automatically by the backend and read as log files 31, 32, 33 from the vehicle data network.

In a subsequent assigning step 2, each of the user interactions recorded in the vehicle operating logs 11, 12, 13 is assigned context information in the form of a functional category 21 of the user interaction and a driving state 22 of the motor vehicle at the time of the user interaction. The functional category 21 records which functionality of the HMI or the motor vehicle is associated with the respective user interaction. The interaction can be assigned to the fields of navigation, vehicle information, settings, telephony, multimedia, tuner, network connection, digital address book, vehicle operating manual, for example. The possible functional categories are numbered, and the number is converted to a bit sequence for further processing by a one-hot encoding. The driving state 22 is characterized by a binary variable that assumes the value one if the vehicle is moving faster than 8 km/h and otherwise assumes the value zero. A complete stop of the vehicle and slow rolling (for example in front of a traffic light) are thus combined and jointly distinguished from a moving state. The interaction logs 11, 12, 13 paired with the context information 21, 22 then serve as the training set 14 on which the creation of the model is based.

Lastly, in the training step 3, a context-sensitive interaction model 15 is trained by machine learning on the basis of the training data 14 to make a prediction about a future user interaction on the basis of a time sequence of past user interactions. The classifier of the model 15 is a decision tree having a maximum tree depth of 8. For example, the decision tree can be trained to predict whether the next input will be via the touch screen (category "touch"), by actuating or activating a hardkey (category "hardkey") or by a voice input (category "speech"). The model 15 is therefore trained to answer the following question: "If the user were to interact with the HMI at the present time, what would the input mode of that interaction be." The prediction of model 15 can then be used to prepare or initiate the interaction. Two applications are possible, for example. First, based on the prediction, the user's attention can be directed visually. A display may remain dimmed in low ambient light conditions when "hardkey" or "speech" are predicted, for example, but illuminated when "touch" is predicted. Another application is to reduce interactions with the touch screen, in particular when the driver is stressed by the current driving situation. The interaction model 15 can, for instance, be used to predict the next input (for example via a one- or multi-finger gesture) on the touch screen and make the adjustment to the display triggered by the input without the input actually taking place.

It is to be appreciated that the various features shown and described are interchangeable, that is a feature shown or described in one embodiment may be incorporated into another embodiment. It is further to be appreciated that the methods, functions, algorithms, etc. described above may be implemented by any single device and/or combinations of devices forming a system, including but not limited to storage devices, processors, memories, FPGAs, DSPs, etc.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth below. The detailed description is to be construed as exemplary only and does not describe every possible embodiment, as describing every possible embodiment would be impractical, if not impossible. One could implement numerous alternate embodiments, using either current technology or technology developed after the filing date of this document, which would still fall within the scope of the claims.

The invention claimed is:

1. A method (10) for producing a model (15) for automated prediction of interactions of a user with a user interface of a motor vehicle, the method comprising:
   providing vehicle operating logs (11, 12, 13) where each vehicle operating log (11, 12, 13) includes a record of a time sequence of user interactions with the user interface, wherein providing includes filtering or pre-processing raw data read from a data network of the motor vehicle and converting the raw data into structured data sets in the form of a tabular database;
   assigning context information (21, 22) to each of the user interactions recorded in the vehicle operating logs (11, 12, 13), the context information (21, 22) including a functional category (21) of the user interaction and a driving state (22) of the motor vehicle at the time of the user interaction, wherein the functional category (21) is converted by a one-hot encoding into a bit encoding that identifies the functional category;
   generating training data (14) based on the vehicle operating logs (11, 12, 13) and the associated context information (21, 22)
   training a context-sensitive interaction model (15) by machine learning based on the training data (14) to make a prediction about a future user interaction based on a time sequence of past user interactions, wherein training includes executing a training routine over the entire data set to produce a classifier in the form of a decision tree having a maximum tree depth of 8;
   adjusting a display field on the user interface based on the prediction about the user interaction to direct attention of the user to a control element or a display element of the user interface; and
   triggering the user interface to perform the predicted user interaction without or before interaction of the user with the user interface for functional categories and driving states where diversion of the driver to the user interface should be reduced.

2. The method (10) of claim 1, wherein the functional category (21) for assignment to the respective user interaction is selected from predetermined functional categories that include: navigation, vehicle information, settings, telephony, multimedia, tuner, network connection, digital address book, and digital vehicle operating manual.

3. The method of claim 1, wherein the driving state (22) for assignment to the respective user interaction is selected from predetermined driving states, and the selection is made on the basis of a driving speed of the motor vehicle at the time of the user interaction.

4. The method of claim 3, wherein the driving state (22) is selected from two predetermined driving states, including a first driving state that is selected when the driving speed of the motor vehicle is above a predetermined threshold value and if not a second driving state is selected.

5. The method of claim 1, further comprising selecting a classifier for the context-sensitive interaction model (15) based on the training data (14) and the selecting is carried out after assigning context information (21, 22) and before training the context-sensitive interaction model (15), wherein the selection of the classifier being carried out by means of a grid search with a cross-validation on the training data (14), and the classifier is selected from: an Extra Trees classifier, a Random Forest classifier, an AdaBoost classifier, a Gradient Boosting classifier, a support-vector machine, and a decision tree.

6. A method for automated prediction of interactions of a user with a user interface of a motor vehicle, comprising using an interaction model (15) produced by the method (10) of claim 1 to make a prediction about a future user interaction based on a time sequence of past user interactions in a prediction step, wherein the prediction being made about a future user interaction which in terms of time immediately follows a most recently carried out user interaction.

7. The method of claim 6, further comprising making a prediction of an input mode of the future user interaction, wherein the input mode is one of: touchscreen, hardkey, speech.

8. The method of claim 6, wherein adjusting a display field of the user interface based on the prediction about the future user interaction includes adjusting a scaling and/or shifting of a displayed content or a visual highlighting of a control element and/or a display element.

9. The method of claim 6, further comprising reading vehicle operating data (31, 32, 33) from the data network of the motor vehicle and/or one or more other motor vehicles for providing the vehicle operating logs (11, 12, 13) and reading the vehicle operating data (31, 32, 33) from the data network of the motor vehicle for recording the time sequence of past user interactions, and the vehicle operating data (31, 32, 33) being read from a CAN bus.

10. A data processing unit for a motor vehicle, characterized in that the data processing unit is configured to carry out the method of claim 6.

11. A motor vehicle comprising the data network and a data processing unit, the motor vehicle being configured to carry out the method (10) of claim 1 and the data processing unit being configured to read vehicle operating data (31, 32, 33) from the data network and, based on the vehicle operating data (31, 32, 33), provides vehicle operating logs (21, 22, 23), and the data processing unit is configured to carry out the assigning of the context information (21, 22) to each of the user interactions recorded in the vehicle operating logs (11, 12, 13) and to carry out the training of a context-sensitive interaction model (15).

\* \* \* \* \*